United States Patent Office 3,351,094
Patented Nov. 7, 1967

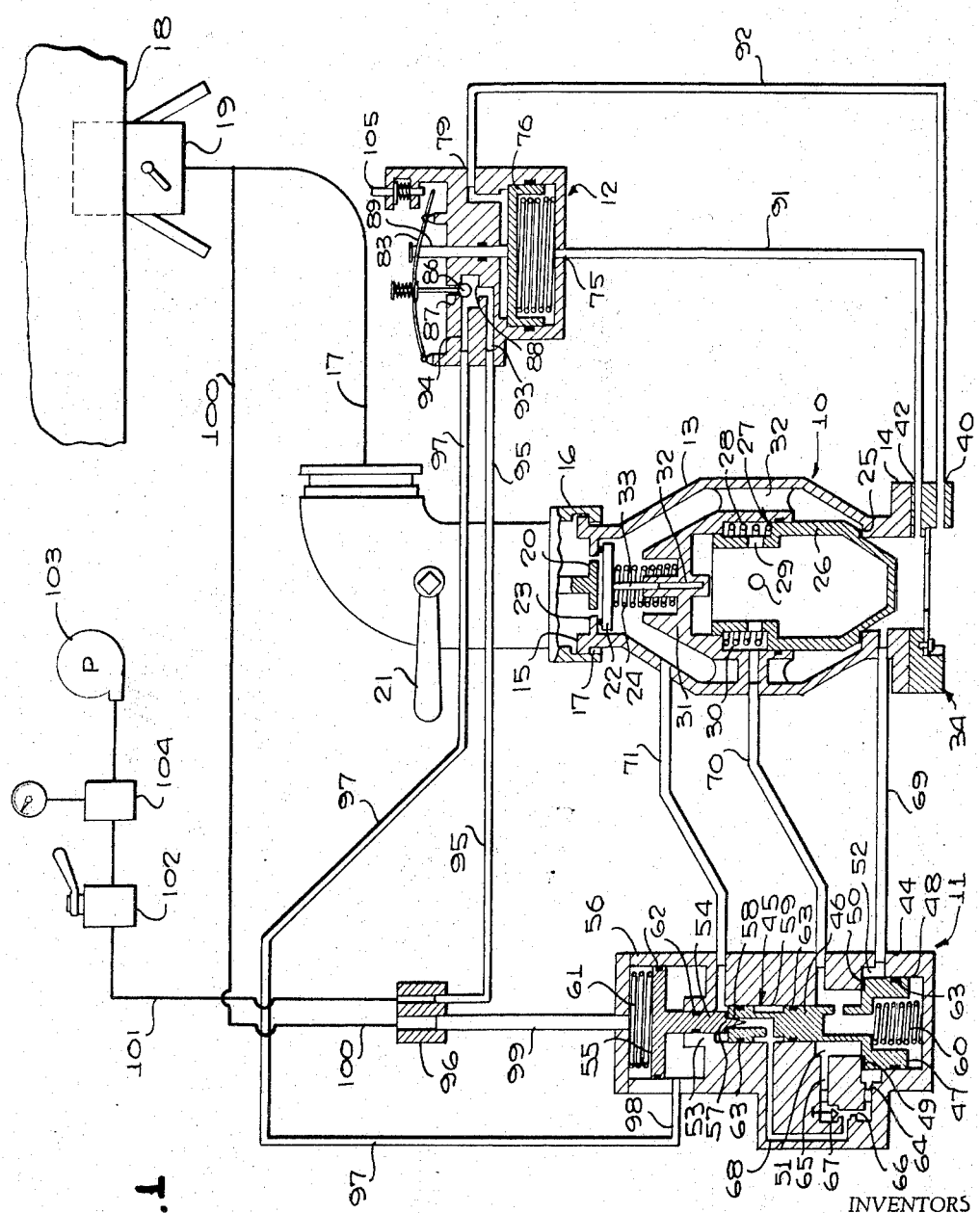

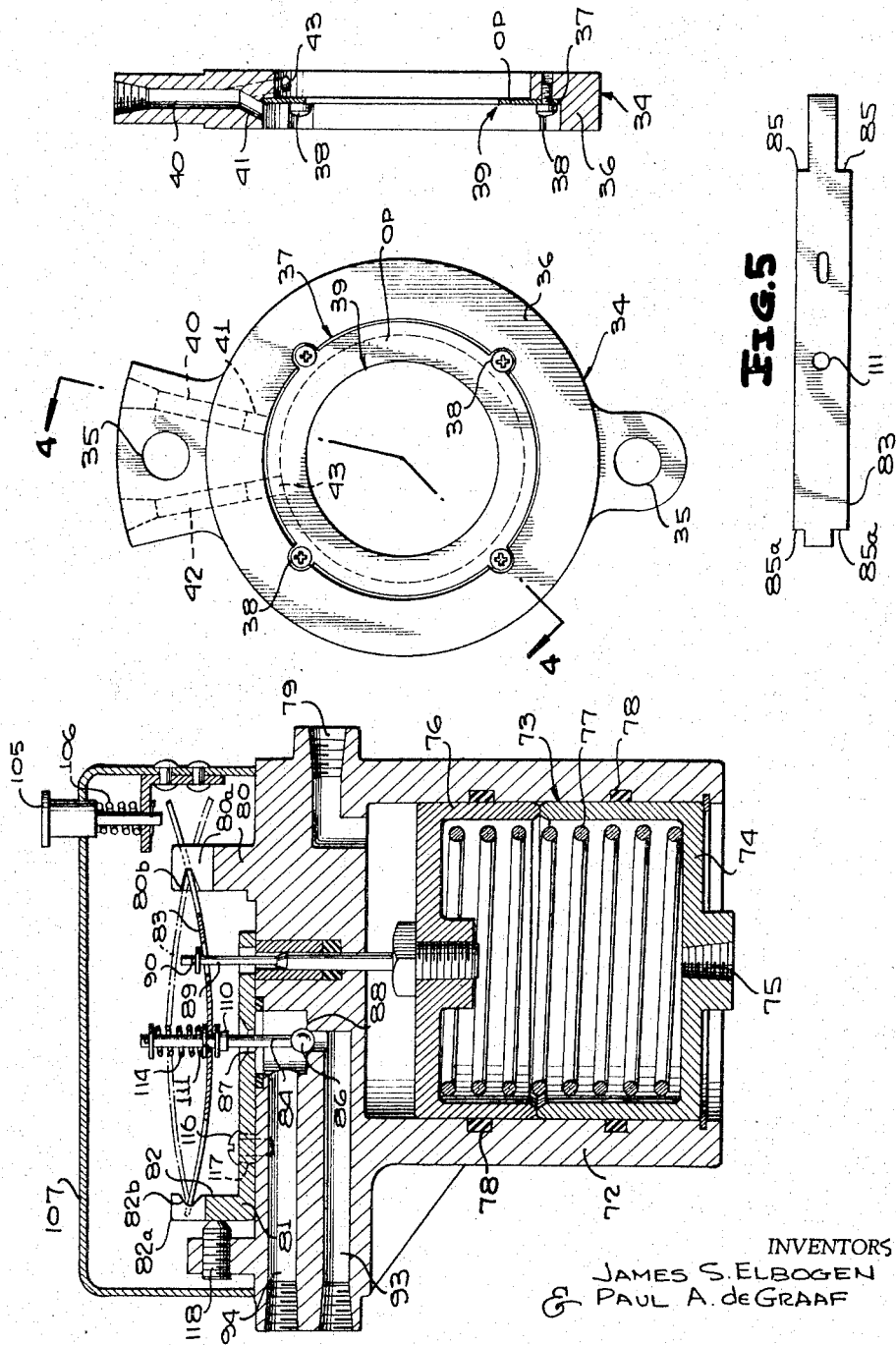

3,351,094
EXCESS FLOW SHUT-OFF SERVO VALVE
James S. Elbogen, Encino, and Paul A. de Graaf, Los Angeles, Calif., assignors to Parker-Hannifin Corporation, Cleveland, Ohio, a corporation of Ohio
Original application Oct. 9, 1961, Ser. No. 143,677, now Patent No. 3,221,764, dated Dec. 7, 1965. Divided and this application Oct. 21, 1965, Ser. No. 499,170
11 Claims. (Cl. 137—625.66)

This application constitutes a division of my copending commonly assigned application for U.S. Letters Patent, Ser. No. 143,677, filed Oct. 9, 1961 and now Patent No. 3,221,764.

The invention relates generally to the fueling of planes or the controlled delivery of fuel to comparable storage facilities and is primarily directed to a novel servo operated shut-off valve for use with a pilot valve controlled regulator for automatically terminating the delivery of fuel upon the happening of some emergent condition, such as a break in the delivery hose, accidental separation of the parts, faulty coupling of the parts, or any other condition which may cause an excessive rate of fuel flow.

An object of the invention is to provide a novel shut-off servo valve adapted for use in conjunction with a fueling arrangement of the character in which an orifice plate is provided at an inlet into a pressure regulator, and wherein the servo valve is coupled to the orifice plate and is ineffective so long as the pressure differential between opposite sides of the orifice plate is less than a predetermined maximum, but is effective whenever the predetermined maximum differential is exceeded to bring about a closing of the regulator and discontinuance of fuel delivery.

Another object of the invention is to provide a novel servo valve of the character stated wherein the servo valve includes a piston movable upon a predetermined differential pressure condition at opposite sides thereof for closing a control valve and bringing about the desired closing of the regulator valve.

A further object of the invention is to provide a novel snap-acting servo valve of the character stated wherein a valve body of the servo valve is moved by a bowed snap spring, the snap spring being moved in one direction by movment of the piston, and in the opposite direction by a manually operable re-set button.

With the above and other objects in view that will hereinafter appear, the nature of the invention will be more clearly understood by reference to the following detailed description, the appended claims and the several views illustrated in the accompanying drawings.

In the drawings:

FIGURE 1 is a schematic sectional view illustrating a fuel system, the excess flow shut-off servo valve of the invention being shown in the normal, valve open position, the regulator servo piston being shown in a poppet needle closing position and a main valve in the regulator being shown in its seated or closed position.

FIGURE 2 is an enlarged detail sectional view illustrating the excess flow shut-off servo valve in its valve seated condition.

FIGURE 3 is a plan view of the orifice plate.

FIGURE 4 is a vertical cross-section taken on the line 4—4 of FIGURE 3.

FIGURE 5 is a plan view of the snap spring for the excess flow servo valve.

The novel shut-off servo valve of this invention will be best understood by first describing a fuel delivery system illustrated schematically in FIGURE 1 which includes a main valve section generally designated 10, a pilot or servo valve section generally designated 11, and excess flow shut-off servo section (unnumbered) which includes an excess flow shut-off servo valve generally designated 12. The regulator 10 includes a housing 13 having a flange 14 at one end thereof for attachment to a source of supply. At the other end, the housing has attached to it an adaptor fitting 15 for connection with a coupler schematically indicated at 16, bayonet lugs 17 being provided for this purpose. The coupler is in turn schematically indicated as attached to a conduit 17 through which fluid may be delivered to the receiving tank 18 through the usual quick detachable nozzle means indicated at 19.

The coupler 16 may be of any suitable form, but preferably of the type shown in FIGURE 2 of the Davies Patent 2,630,822 and includes a coupler valve 20 for opening and closing the coupler through manual actuation of the handle 21. In such case, a poppet valve 22 is provided within the regulator housing 13 for closing the outlet port 23, said poppet valve 22 being normally closed against its seat by a spring 24. Poppet valve will be unseated by the projection of the valve 20 when the couple is completed and the handle 21 is manipulated to open communication through the regulator outlet into the fluid delivery line 17.

At the inlet end of the regulator housing 13 there is provided a seat 25 against which the main valve 26 is engageable, said valve being slidably mounted in the housing at 27 and constantly urged toward its seat by spring means 28. Ports 29 open to the interior of the main valve 26 from a surrounding pressure chamber 30 forming a part of the slideway in which the main valve is mounted, said chamber and slideway being provided in a sleeve or shell-like body 31 supported in spaced relation within the housing 13 on suitable webbing 32. It will be noted that the body 31 serves as a mounting for the poppet seating spring 24, and also provides guide means at 32 for the poppet valve stem 33.

At the entrance end or lower portion of the regulator housing 13 an orifice plate assembly generally designated 34 is mounted as at 35. This assembly includes a supporting plate 36 (FIGURES 3 and 4) which is recessed at 37 to receive the orifice plate or ring OP which is removably mounted at 38 and presents a restricted orifice or inlet opening 39. A high pressure port is formed radially in the plate at 40 and opens through an angular extension 41 into the interior of the plate opening above the orifice plate as indicated in full lines in FIGURE 4 and a low pressure port 42 is formed radially in the plate 36 and opens through an angular extension 43 into the interior of the plate below the orifice plate as indicated in dotted lines in FIGURES 3 and 4 of the drawings.

The pilot or servo valve section includes a housing 44 having a bore 45 therein wherein the plunger 46 projecting from a fast closing servo piston 47 is reciprocable, said piston being slidable in a counterbore 48 and having thereon a seat ring 49 engageable with the seat 50 provided by the counterbore 48. Between the bore 45 and the counterbore 48 a counterbore 51 is provided, the same providing a flow chamber about the plunger 46 above the piston 47 and the housing 44 also is provided with an annular chamber 52 providing a flow chamber about the upper portion of the piston 47.

At this upper end, the housing 44 is provided with a guide or bore 53 wherein a plunger 54 is slidable, the same depending from a regulator servo piston 55 which is reciprocable in a cylinder portion 56 of the housing 44 and carries a needle valve 57 at its lower end extremity. The needle projection 57 on the regulator servo piston plunger projection 54 seats in an axial bore 58 opening through the upper end of the fast closing servo piston plunger 46, and radially outward into an annular clearance 59 in the exterior of said plunger 46.

The fast closing servo piston 47 is constantly urged toward its seat by a spring means 60 of predetermined value and the regulator servo piston 54 is constantly urged toward its needle projection seating position by spring means 61 of predetermined value, their purposes to be described in detail hereinafter. It is also to be noted that the regulator servo piston 55 and plunger projection 54 are suitably sealed at 62, and the fast closing servo piston 47 and its plunger projection 46 are suitably sealed at 63.

Within the housing 44, the annular chamber 52 surrounding the fast closing servo piston and the annular chamber 51 surrounding the plunger 46 are connected by communicating screened ducts 64 and 65, the former having choked outlet at 66, and the latter having adjustable needle valve control choke at 67. A ducting 68 communicates with the chamber forming clearance 59 about the piston plunger projection 46 and with the ducts 64 and 66 at a point between the chokes or bleed points 66 and 67, as clearly illustrated in FIGURE 1 of the drawings.

It will be apparent by reference to FIGURE 1 that the chamber 52 surrounding the fast closing servo piston is connected by a duct 69 with the regulator housing at a point just below the main valve seat 25. It will also be apparent that chamber 51 communicates through a duct 70 with the previously mentioned chamber 30 in the regulator, and the plunger bore 45 at the location of the regulator servo piston carried needle 57 is connected by a duct 71 with the interior of the regulator housing 13 adjacent the upper or outlet end thereof.

The excess flow shut-off servo 12 (FIGURE 2) includes a casing 72 providing a cylindrical chamber 73 closed by a cup-like closure 74 having a low pressure port at 75. A piston 76 is reciprocable in the cylinder 73 and is constantly urged to a raised position by a spring means 77 interposed between the piston and the closure 74. The piston and the closure are suitably sealed at 78. The casing also is equipped with a high pressure port 79 opening into the cylinder 73 above the piston 76.

A support 80 having forks at 80a with notches 80b, rises from the casing 72 and cooperates with an adjustably mounted member 81, having a standard 82 similarly forked and notched at 82a and 82b, in supporting a snap leaf spring 83 on which a ball valve carrier 84 is mounted. As shown in FIGURE 5, snap spring 83 is reduced in width on each end to provide shoulders 85 and 85a for engaging the notches in supports 80 and 82 respectively. The carrier 84 carries a ball valve 86 at its lower end extremity in position for seating upwardly against a vent closing seat 87 or downwardly against a pressure cutoff seat 88. The normal position of the spring 83 is shown in FIGURE 1 of the drawing, or in other words, in the position for presenting the valve 86 in its pressure open, vent closing position.

An actuator pin 89 projects upwardly from the piston 76 and has an actuator portion 90 overlying the leaf spring 83 so that whenever the piston 76 is depressed it will snap the leaf spring downwardly to remove the ball valve 86 from its vent closing position shown in FIGURE 1 and place it in its pressure cut-off position shown in FIGURE 2.

The low pressure port 75 of the excess flow shut-off servo is connected by a duct 91 (FIGURE 1) with the low pressure outlet 42 of the orifice plate and the high pressure port 79 of said servo is connected by a duct 92 with the high pressure outlet 40 of said orifice plate.

The casing 72 has a pressure inlet port 93 opening through the ball seat 88, and a pressure outlet port 94 which is closed to pressure when the ball is seated on seat 88. There is an inlet duct 95 leading from connector means 96 to the inlet port 93, and an outlet duct 97 which connects the outlet port 94 with the pilot or servo valve section cylinder 56 at 98, or in other words, at a point beneath the piston 55. The cylinder 56 is connected above the piston 55 by a duct connection 99 with the connector means 96, and therethrough at 100 with the delivery line 17 downstream of the regulator or main valve 10. The inlet duct 95 connects with the connector means 96 and therethrough at 101 with a manual control valve 102 which in turn connects with a source of actuator or reference air pressure 103 through a pressure regulator 104.

A re-set button 105 is provided on the excess flow shut-off servo valve or means 12, said button being spring projected at 106 to a readily accessible position without the protective housing 107.

Ball valve carrier 84 has an enlargement 110. The portion of the carrier above the enlargement projects through an opening 111 in snap spring 83. Loosely fitting washers 112 and 113 are on opposite sides of the snap spring, washer 112 butting against enlargement 110 and washer 113 being pressed by spring 114 against the snap spring.

To provide for setting and/or adjusting the throw of snap spring 83 and hence the seating pressure which will be applied to ball valve 86, member 81 is adjustably mounted. Normally member 81 is held in a fixed position by screws 116, one of which is shown in FIGURE 2, the screws passing through elongated slots 117 in member 81. To set or adjust the throw of snap spring 83, screws 116 are loosened and screw 118 is turned to increase or decrease the bowing of the snap spring by moving member 81 toward or away from notched support 80 to thus adjust the seating pressure of ball 86 on seat 88. Screws 116 are then tightened to lock member 81 in place.

It is to be understood that the excess flow shut-off servo valve 12 is in its normal condition when its piston 76 is in its raised position and the control ball valve 86 is in its raised position closing off vent port 87 and opening valve seat 88 to provide communication through the service or actuating pressure lines or ducts 95 and 97.

It is to be understood also that the piston 47 in the pilot or servo valve means engages on the seat 50 on a diameter the same as or slightly less than the outer diameter of the seating ring or packing 49 so that the piston 47 is substantially balanced, or slightly overbalanced in a seating direction by pressure of fluid beneath said piston entering through duct 69, chamber 52, ducts 66 and 65, and the ported and hollow lower portion of the piston plunger 46.

Assume that it is now desired to supply fluid, or in other words fuel, to the tank 18, and that the nozzle 19 has been properly attached to the tank and the coupler 16 with its hose connection 17 to the nozzle 19 has been properly attached to the regulator 10 so that manipulation of the handle 21 opens valve 22 of the regulator. It will be assumed also that the entrant end 14 of the regulator is suitably connected with a source of fuel (not shown) at a point below orifice plate assembly 34.

At this time, the main valve 26 of the regulator is closed due to the action of the spring 30, needle valve 57 is closed by spring 61, and the piston 47 is seated on the seat 50 by the spring 60. Fluid in the inlet port beneath the seated main valve 26 passes through the duct 69, chamber 52, orifice or choke 66, needle valve control choke 67, chamber 51 and duct 70 into the pressure chamber 30 within the regulator. Since the needle valve 57 is seated or closed, the fluid is trapped within the chamber 30 and in the interior of the main valve 26 and exerts a downward pressure on the valve 26 on a greater area than is acted upon by the fuel beneath the valve 26, thereby to hold the main valve in its seated condition.

To start the flow of fuel, the operator manipulates the valve 102 so that the reference air pressure, regulated at 104, is directed into the inlet line or duct 95 and past the unseated ball valve 86 into the outlet line or duct 97 and into the chamber beneath the regulator servo piston 55. It is to be understood that the valve 102 is in the nature of a "dead man" control in that it must be manually held to an open position in order for the fueling operation to continue. Any time this lever is released, closing of the main valve will be brought about automatically.

The air pressure thus directed upwardly against the regulator servo piston 55 lifts the needle valve 57 to open the communication between the ducts 68 and 71 and thereby relieve pressure from the chamber 30 within the regulator and the main valve 26 therein into the lower pressure outlet from the regulator housing 13. This release of pressure is at a greater rate than the rate at which pressure can re-enter the chamber 30 through the connections 69, 52, 64, 66, and thus the pressure tending to lift or open the main valve 26 becomes dominant and said main valve is opened and fuel entering the regulator housing 13 will pass about the shell-like body 31 and out past the unseated poppet valve 22.

As delivery pressure builds up in the delivery line or conduit 17, fuel pressure in the chamber above the regulator servo piston 55 will approach the desired regulated pressure predetermined by the pressure regulator 104. As the desired regulated pressure is thus attained, the piston 55 and the needle valve 57 carried thereby are forced downward to throttle the bleed-away flow from the chamber 30. This causes pressure within the chamber 30 and within the interior of the main valve 26 to build up and start closing movement of the valve 26 with consequent throttling of the flow through the main housing 13 toward the receiving tank 18. At some point of throttled flow, the pressure in the chamber above the regulator servo piston 55 will counterbalance the fixed air pressure within the chamber below said piston to stabilize the positions of the needle valve 57 and the valve 26 so as to maintain the desired regulated delivery pressure in the nozzle 19.

It is customary to provide means for automatically cutting off the flow when the tank 18 has been filled, this being accomplished by means not shown and forming no part of the present invention. When this occurs, it causes the pressure in delivery line 17 to increase and also to bring about an increase of pressure in the chamber above the regulator servo piston 55. This causes the needle valve 57 to be depressed and close off the exhausting of pressure from the regulator chamber 30 into the lower pressure outlet of said regulator, and the resultant building up of pressure within the chamber 30 and the interior of the valve 26 brings about a returning of the valve 26 to its seated condition.

The piston valve 47 serves as a means for directing flow from the inlet immediately beneath the main valve 26 to the regulator chamber 30 and the interior of the main valve 26 for rapidly filling the same and bringing about a quick closing of the main valve 26 upon closing of the needle valve 57, or upon sudden increase in the delivery pressure at the tank 18. In either case, the increase of pressure at the tank 18 will be reflected back through the line 17 where it will cause rapid increase in the chamber of the cylinder 56 immediately above the regulator and servo piston 55. This will cause the needle valve carrying piston projection 57 to move to the needle valve closing position and then continue on to force the piston plunger projection 46 downwardly, thereby unseating the piston valve 47 on its seat 50. With the piston valve thus unseated, fluid from the regulator inlet beneath the main valve 26 will pass through duct 69, chamber 52 and directly through the chamber 51 and duct 70 into the regulator chamber 30 and the interior of the hollow valve 26 to bring about a quick seating of said hollow valve.

Opening 39 in orifice plate OP provides a slight restriction of inlet flow to regulator valve 10 and thus pressure of fluid on the upstream side of the plate will be higher than the pressure of fluid on the downstream side while fluid in flowing and the faster the flow the greater the differential in such pressures. When the differential reaches a predetermined amount corresponding to a predetermined flow rate which is considered to be excessive, the said differential brings about shifting of the excess flow servo valve 12 to close air reference pressure duct 95 and open duct 97 to vent with resultant closing of servo valve 54 and main valve 26.

In the normal condition of the parts, the ball valve 86 is in its lifted position closing the exhaust or venting port at 87 and opening communication between the ducts 95 and 97 at seat 88. As fluid flows through the orifice plate OP the pressure downstream thereof is presented to the lower side of piston 76 through conduit 91 and the pressure on the upstream side thereof is presented to the upper side of the piston through conduit 92. As the flow rate through the orifice plate OP increases, the pressure differential across the piston 76 in the excess flow shut-off servo increases. When the flow rate reaches the predetermined cut-off point, the pressure differential across the piston 76 overcomes the spring 77 and the piston is moved downwardly, snapping the leaf spring 83 downwardly to bring about the seating of the ball 86 at 88 and closing off communication from the service pressure source through 95 and 97 to the cylinder 56 beneath the regulator servo piston 55 and venting air on the lower side of piston 55 to atmosphere through conduit 97 and vent port 87. This causes closing of servo valve 54, pressure regulator or main valve 26, discontinuing the infeeding of fuel. The normal position of snap spring 83 can be restored only by manual depression of the re-set button 105 and the resulting opening of the ball valve 86 by the snapping upwardly of the leaf spring 83.

While a preferred structure and arrangement of parts adapted for practicing the invention have been disclosed herein it is to be understood that changes in structure and arrangement of such parts may be made without departing from the scope of the invention as defined in the appended claims.

We claim:

1. A servo valve comprising a body having inlet and outlet ports, a valve member, a spring connected to the valve member, said spring having a first over-center position for normally holding the valve member in a first position for communicating the inlet port with the outlet port and having a second over-center position for holding the valve member in a second position for closing off communication between the inlet and outlet ports, said spring having a fixed distance between its ends and being oppositely sprung in its over-center positions, fluid pressure operated means for directly contacting and moving said spring from said first over-center position to said second over-center position, and reset means for moving said spring from said second over-center position to said first over-center position.

2. A servo valve comprising a body having inlet and outlet ports, a valve member, a spring connected to the valve member, said spring having a first over-center position for normally holding the valve member in a first position for communicating the inlet port with the outlet port and having a second over-center position for holding the valve member in a second position for closing off communication between the inlet and outlet ports, fluid pressure operated means for moving said spring from said first over-center position to said second over-center position, and reset means for moving said spring from said second over-center position to said first over-center position; wherein said spring is in leaf form, each end of the leaf being engageable with a support for causing the leaf to be bowed in each of said first and second over-center positions, and means for varying the spacing of said supports for varying the amount of said bowing.

3. A servo valve comprising a body having inlet and outlet ports, a valve member, a spring connected to the valve member, said spring having a first over-center position for normally holding the valve member in a first position for communicating the inlet port with the outlet port and having a second over-center position for holding the valve member in a second position for closing off communication between the inlet and outlet ports, fluid pressure operated means for moving said spring from said first over-center position to said second over-center position, and reset means for moving said spring from said second over-center position to said first over-center position; wherein said spring is in leaf form, each end of the leaf being engageable with a support for causing the leaf to be bowed in each of said first and second over-center positions, said valve member having a stem, a fixed shoulder on said stem engageable by said leaf spring in the said second over-center position for urging the valve member to said second position, and a yieldable shoulder on said stem engaged by said leaf spring in said first over-center position for urging said valve member to said second position.

4. A servo valve comprising a body having inlet, outlet and vent ports, a valve member, a spring connected to said valve member, said spring having a first over-center position for normally holding the valve member in a first position for communicating the inlet port with the outlet port and closing the vent port, and having a second over-center position for holding the valve member in a second position for closing off communication between the inlet and outlet ports and opening the vent port, said spring having a fixed distance between its ends and being oppositely sprung in its over-center positions, fluid pressure operated means for directly contacting and moving said spring from said first over-center position to said second over-center position, and reset means for moving said spring from said second over-center position to said first over-center position.

5. The servo valve in accordance with claim 4 wherein said fluid pressure operated means include a piston reciprocally mounted in a chamber, and port means for introducing control fluid into said chamber at each side of said piston.

6. The servo valve in accordance with claim 5 wherein spring means are provided for normally urging said piston to a position at which said spring is held in the first over-center position thereof.

7. The servo valve in accordance with claim 5 wherein said piston includes an operatively connected piston rod, means connecting said piston rod to said spring, said connecting means being operative to move said spring from the first over-center position to the second over-center position upon the movement of said piston in a first direction but being incapable of moving said spring from the second over-center position to the first over-center position upon the movement of said piston in a second direction opposite to said first direction.

8. The servo valve in accordance with claim 4 wherein said fluid pressure operated means includes a piston mounted in a chamber, a spring-moving member directly operatively connected to said piston and adapted for contacting engagement with said spring, and port means for introducing control fluid into said chamber at each side of the piston.

9. A servo valve comprising a body having inlet, outlet and vent ports, a valve member, a spring connected to said valve member, said spring having a first over-center position for normally holding the valve member in a first position for communicating the inlet port with the outlet port and closing the vent port, and having a second over-center position for holding the valve member in a second position for closing off communication between the inlet and outlet ports and opening the vent port, fluid pressure operated means for moving said spring from said first over-center position to said second over-center position, and reset means for moving said spring from said second over-center position to said first over-center position; wherein said spring is in leaf form, each end of the leaf being engageable with a support for causing the leaf to be bowed in each of said first and second over-center positions, and means for varying the spacing of said supports for varying the amount of said bowing.

10. A servo valve comprising a body having inlet, outlet and vent ports, a valve member, a spring connected to said valve member, said spring having a first over-center position for normally holding the valve member in a first position for communicating the inlet port with the outlet port and closing the vent port, and having a second over-center position for holding the valve member in a second position for closing off communication between the inlet and outlet ports and opening the vent port, fluid pressure operated means for moving said spring from said first over-center position to said second over-center position, and reset means for moving said spring from said second over-center position to said first over-center position; wherein said spring is in leaf form, each end of the leaf being engageable with a support for causing the leaf to be bowed in each of said first and second over-center positions, said valve member having a stem, a fixed shoulder on said stem engageable by said leaf spring in the said second over-center position for urging the valve member to said second position, and a yieldable shoulder on said stem engaged by said leaf spring in said first over-center position for urging said valve member to said second position.

11. A servo valve comprising a body having inlet, outlet and vent ports, a valve member, a spring connected to said valve member, said spring having a first over-center position for normally holding the valve member in a first position for communicating the inlet port with the outlet port and closing the vent port, and having a second over-center position for holding the valve member in a second position for closing off communication between the inlet and outlet ports and opening the vent port, fluid pressure operated means for moving said spring from said first over-center position to said second over-center position, and reset means for moving said spring from said second over-center position to said first over-center position; wherein said spring is in leaf form, each end of the leaf being engageable with a support for causing the leaf to be bowed in each of said first and second over-center positions, and said reset means being a movable member normally positioned in non-contacting alignment with one of the ends of said leaf and being movable to a second position for contacting said one end to move said spring from said second over-center position to said first over-center position.

References Cited

UNITED STATES PATENTS

| | | | |
|---|---|---|---|
| 1,524,733 | 2/1925 | Dick | 137—461 |
| 2,644,482 | 7/1953 | McCallum | 137—501 |
| 2,785,698 | 3/1957 | Vance | 137—461 X |
| 2,948,298 | 8/1960 | Gardner | 137—625.25 X |
| 3,094,146 | 6/1963 | Glasgow | 137—459 X |

WILLIAM F. O'DEA, *Primary Examiner.*

H. W. WEAKLEY, *Assistant Examiner.*